Figure 7:
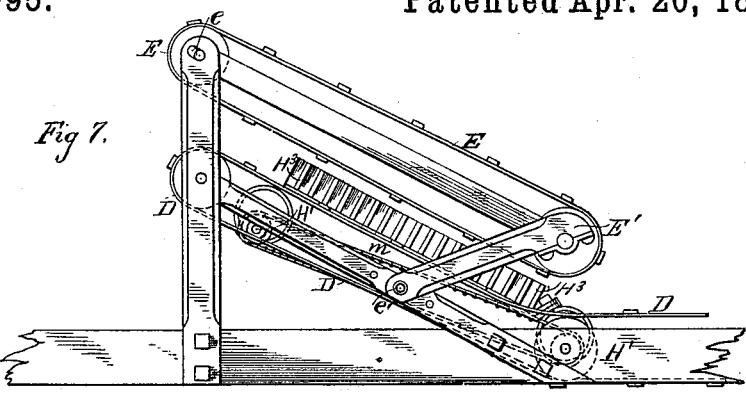

(No Model.)  2 Sheets—Sheet 1.
C. COLAHAN.
HARVESTER AND BINDING MACHINE.
No. 340,095. Patented Apr. 20, 1886.
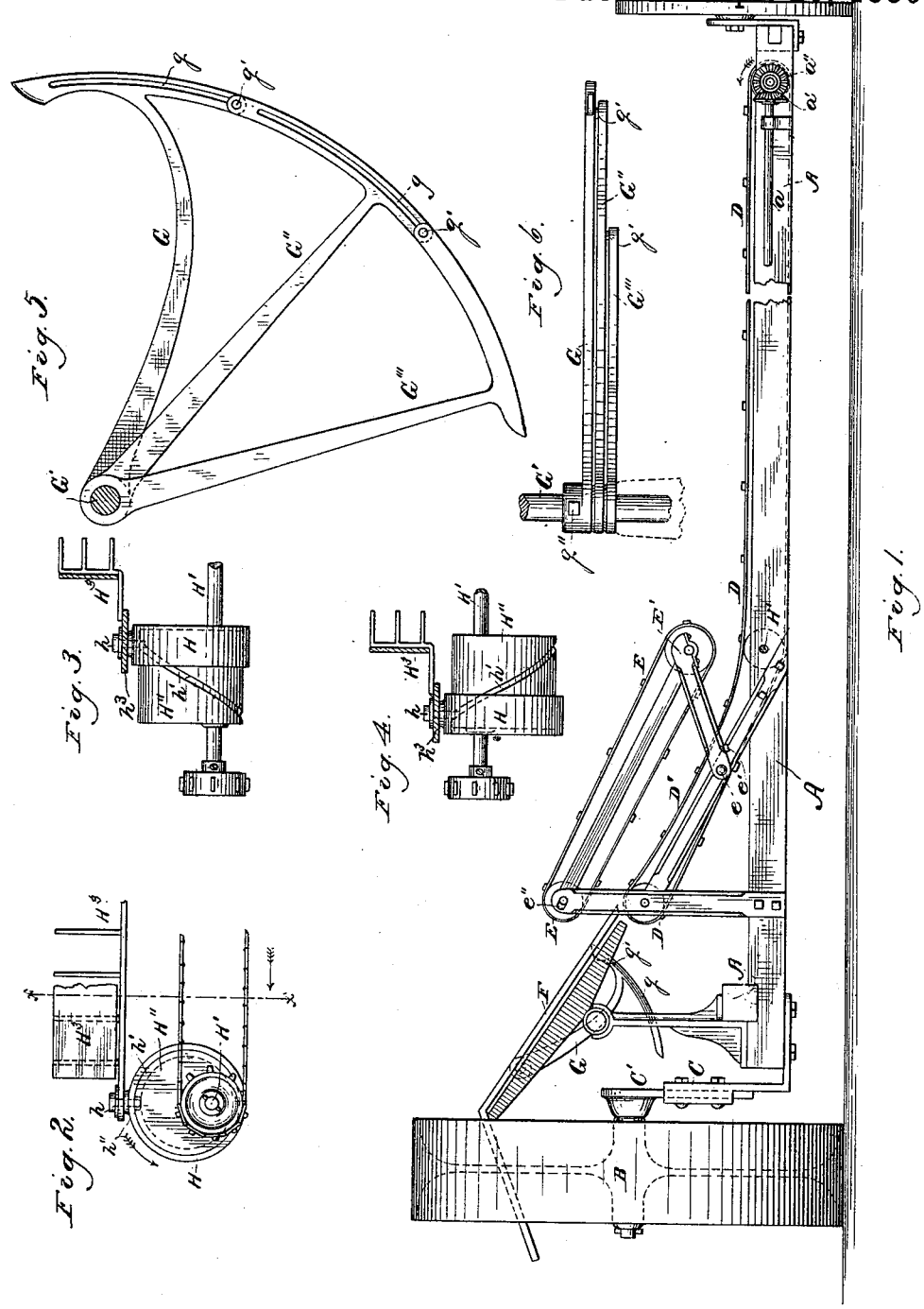

(No Model.) 2 Sheets—Sheet 2.

C. COLAHAN.
HARVESTER AND BINDING MACHINE.

No. 340,095. Patented Apr. 20, 1886.

Witnesses
Saml B. Dover.
E. A. Spooner.

Inventor
Chas Colahan

UNITED STATES PATENT OFFICE.

CHARLES COLAHAN, OF CLEVELAND, OHIO.

HARVESTER AND BINDING MACHINE.

SPECIFICATION forming part of Letters Patent No. 340,095, dated April 20, 1886.

Application filed March 1, 1884. Serial No. 122,607. (No model.)

*To all whom it may concern:*

Be it known that I, CHARLES COLAHAN, of Cleveland, county of Cuyahoga, and State of Ohio, have invented certain new and useful Improvements in Harvester and Binding Machines, of which the following is a description, reference being had to the accompanying drawings, as making part of this specification.

My invention relates to that class of machines in which the grain is secured in a gavel while passing from the carrier-platform in rear of the cutter to its point of discharge in rear or front of the main wheel, as may be deemed preferable, and in the present illustration I have shown it passing over the rear of the wheel similar to the form of construction shown in Patent No. 293,345, and as I provide for binding the grain immediately after it leaves the carrier, and desire to secure a direct action on the grain in a manner to obviate the tendency to thrash the grain, as in all the present packing, elevating, and binding machines, and my binding-arm is located above on the center of the binder-table, and as it has limited room for its vibrations, I have provided for its contraction by constructing it of three pieces, to fold or telescope its parts to require less room when under the binder-table, and thereby retain its separating shield or guard to aid in dividing the grain, the same as in the arm ordinarily used for this purpose. The carrier-apron is extended above the plane of the grain-receiving platform at the heel of the cutter-bar, and said apron-extension acts in conjunction with a short overhanging apron revolving in the same direction, to serve as a shield, and to aid the carrier in forcing the grain into a receptacle in a compressed condition suitable for being bound by the binding mechanism without being acted upon by packing-arms. This compressing-apron is free to rise and fall as the grain requires when passing thereunder, or being temporarily checked by the telescopic needle-guard at the point of discharge when the binding arm is forced up in the process of gathering a bundle. A butt-board or clearing-rake is employed to operate on the butts of the grain, and is located at the lower inside end of the cutting apparatus, and it extends up between the elevating-aprons, and it has a horizontal and also a vertical movement imparted to it in its action on the grain, thus facilitating its advance in a more direct or square condition as it is passed between the elevating-aprons or accumulates during the binding of the preceding bundle, as hereinafter more fully described.

Figure 8:
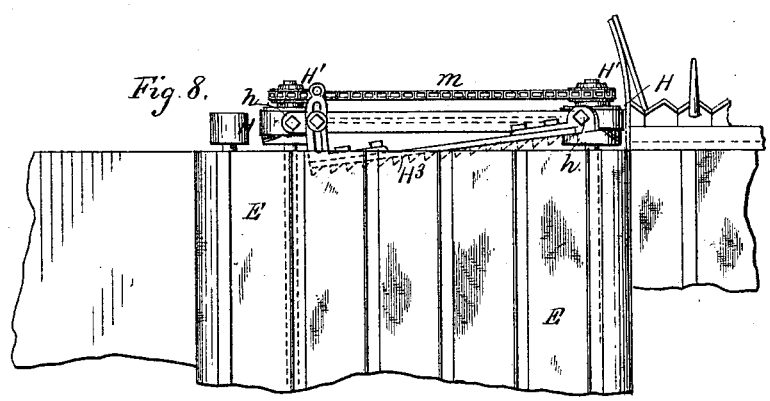
Figure 9:
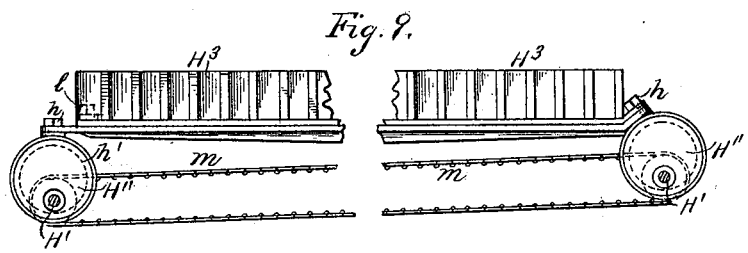
Figure 10:
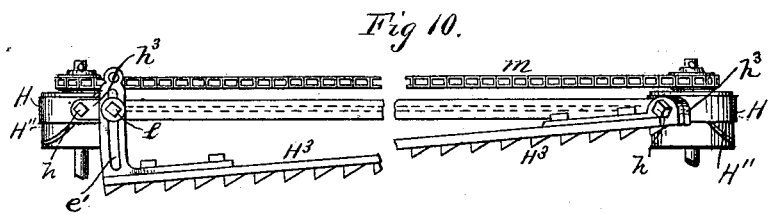

In the accompanying drawings, Figure 1 is a view taken from the front, a section of which also has an illustration of the manner of imparting motion to the outer roller of the carrier at the rear near the grain-wheel. Figs. 2, 3, and 4 are detailed sectional views of the butting-rake, which in its operation is secured in place at the base of the elevator, and is actuated by the shaft $H'$, Fig. 2 being a front view; and Figs. 3 and 4 are end sectional views on line $xx$ of Fig. 2. Fig. 3 shows the position of the rake-fingers advanced while operating against the grain, and Fig. 4 shows its position when it is retracted therefrom. Fig. 5 is an enlarged side view of the binding-arm as it is opened in the process of encircling a bundle. Fig. 6 is a back view of said arm folded back in its normal position, as seen in Fig. 1 of the harvester. Fig. 7 is a side view of the rake $H^3$ as it operates in connection with the harvester and binder. Fig. 8 is a sectional top view, showing attachment and operation of parts, as illustrated. Figs. 9 and 10 are detached views of the butting board or rake $H^3$ and its operating-cylinder $H''$ and the sprocket chain or belt communicating motion to the upper supporting cam-cylinder, which is secured to the frame of the harvester.

A represents the main frame of the harvester; B, the main drive-wheel. C $C'$ represent the adjustable bracket-arms securing the same together. D is the carrier-apron. $D'$ is the elevated extension of the carrier-apron, and E is the supplemental apron, which, with the elevated part of carrier-apron D, acts as a compressing device, operating to deliver and compress a predetermined quantity of grain on the binder-table F when the binder-arm G will vibrate on its axis and carry the twine around the gavel.

$H^3$ represents a horizontally-vibrating and vertically-reciprocating butt board or rake, the arms of which are secured by pivots to plates, which rest on rings H H, and is actuated by the cam-grooved eccentric cylinders, as hereinafter described. The position of the butt-board is adjustable on its upper supporting-plate by means of a slot, $e'$, in said plate, and set-screw $e$, as shown in Figs. 8 and 10. The rings H H encircle the cam-grooved eccentric cylinder-rollers H'' H'', and are provided with pins $h\ h$, to which the butt board or rake supporting-plates $h^3$ are attached. Said pins are provided with rollers $h^2$, which travel in the grooves $h'\ h'$, imparting to the butt board or rake $H^3$, by the revolution of the cam-grooved eccentric cylinders H'' H'', which are rotated by the shafts H' H', to which they are secured, a vertical and horizontal movement as the rake $H^3$ enters between the aprons D' and E and operates against the butts of the grain, and reverse movements downward and away from the said elevating-aprons and grain are imparted to said rake as it recedes therefrom in the process of straightening the grain in the elevator-apron.

G represents the binder-arm, which has folding arms G'' G''' hanging loosely on its vibrating shaft G', and guide-pins $g'$, which move in the slots $g$ as the binder-arm G advances or recedes in the process of binding the bundle. Power is communicated to the carrier-apron through the medium of the shaft $a$ and the bevel-wheels $a'\ a''$. This arrangement causes the outer roller to revolve in direction indicated by the arrow and draw the lower apron straight on the under side, which is desirable to prevent its sagging against the platform. The outer grain-wheel is made adjustable on its bracket similar and to correspond with the main wheel in the raising and lowering of the harvester. The compressing-apron E is adapted to rise and fall at the lower end, its roller being supported on the standard E', which is pivoted at $e$, while the stop-pin $e'$, which is removable, permits its adjustment. The upper standard is grooved at $e''$ to admit this adjustment.

The operation of the harvester is so well known as to require little description.

My object in devising and constructing a machine in this manner is to secure economy, simplicity, and perfection in construction and operation with light draft.

The entire cutting and carrying device, with the binder, may be secured at any desired position to balance on the main axle, while the compressing and carrying aprons may be constructed and placed in a position horizontal with the carrier-platform and the same results of operation secured, and a perfect machine produced at a very small cost.

Having explained my invention, what I claim, and desire to secure by Letters Patent, is—

1. A havesting-machine having a single apron-carrier extending to the binder-table and a vertically-reciprocating horizontally-vibrating butting-rake extending over the delivery end of the carrier, beneath the upper apron, combined with an automatic grain-binder, whereby the grain may be forced directly into the binder by the pressure of said aprons and butting-rake in suitable condition for binding without the use of packing-arms.

2. The vibrating, reciprocating, butting, and gathering rake $H^3$, actuated by the cam-cylinders H'' H'' and their shafts, substantially as shown and described.

3. The binder-arm G, having its folding arms G'' G''' hanging loosely on its vibrating shaft G', with its guide-pins $g'$ and the guide-slots $g$, operating substantially as shown and described.

4. The butting-rake $H^3$, having a horizontal and also a vertical movement imparted to it by the action of its grooved cam-cylinders H'' H'' and their actuating-shafts H' H', operating substantially as shown and described.

5. In a harvester, the combination of the carrier D, its delivery end elevated at the heel of the cutter-bar, actuated by shaft $a$ and its pinion, the short supplemental adjustable compressing-apron E, clearing-rake $H^3$, binder-table F, and gavel-arm G, operating substantially as shown and described.

6. The compressing-apron E and its pivoted standard E', combined with the delivery-apron D', and the butting-rake $H^3$, and the gavel-arm G, whereby an expanding receptacle is created for the accumulation of grain and straightening the same when the gavel is being formed.

CHAS. COLAHAN.

Witnesses:
SAML. JOHNSTON,
FREDERICK C. GOODWIN.